HYDRAULIC AUTOMATIC BRAKE ADJUSTMENT

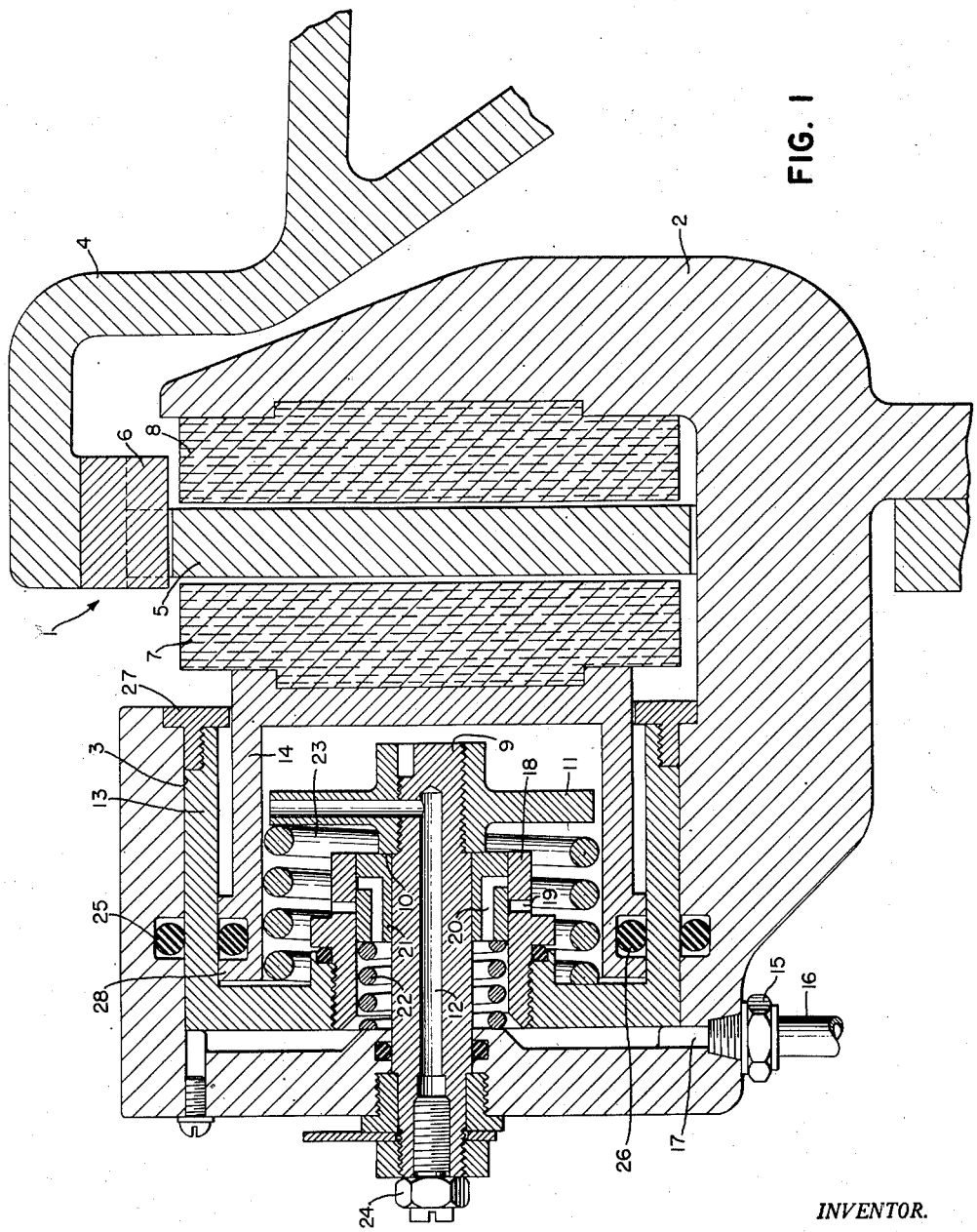
Dec. 24, 1957 — E. WOLF — 2,817,419
HYDRAULIC AUTOMATIC BRAKE ADJUSTMENT
Filed May 8, 1956 — 2 Sheets-Sheet 1
FIG. I
INVENTOR.
EDWARD WOLF
BY
R. L. Miller
ATTORNEY Dec. 24, 1957  E. WOLF  2,817,419

Filed May 8, 1956  2 Sheets-Sheet 2

INVENTOR.
EDWARD WOLF

BY
*R. L. Miller*
ATTORNEY

United States Patent Office 2,817,419
Patented Dec. 24, 1957

2,817,419
HYDRAULIC AUTOMATIC BRAKE ADJUSTMENT

Edward Wolf, Cuyahoga Falls, Ohio, assignor to The Goodyear Tire & Rubber Company, Akron, Ohio, a corporation of Ohio Application May 8, 1956, Serial No. 583,450

8 Claims. (Cl. 188—72)

This invention relates to brakes, and especially to brakes such as are used on aircraft today and wherein automatic compensation means are built into the brake to adjust and control the no-load or released position of the brake automatically as brake lining wear occurs in use of the brake.

Heretofore there have been different types of automatic adjustment pins provided, but one principal commercial construction at the present time is of the type shown in U. S. Patent No. 2,392,970. Such a brake construction involves the use of an automatic adjustment pin which is frictionally held in place in the braking means and controls the no-load, or clearance position in the brake. However, as brake lining wear occurs, the frictional forces on the automatic adjustment pin are overcome by the braking forces applied to move the pin to a new position and permit gradual movement of the brake lining along the longitudinal axis of the adjustment pin to compensate for brake lining wear and maintain a substantially standard clearance in the brake as brake lining wear occurs.

One problem in brake lining control means as referred to hereinbefore has been that it is rather costly to construct these automatic adjustment clearance devices of the prior types, while in some instances, the desired full clearance action is not secured in the brake when released.

The general object of the present invention is to provide automatic adjustment means in brakes of the type referred to wherein a pair of telescopically arranged, independently movable control pistons are used for controlling brake action and for automatically compensating for wear of the brake lining means in the brake.

Another object of the invention is to provide a constant brake clearance construction operative under all conditions usually encountered in brake action.

Another object of the invention is to provide brake automatic adjustment control means that have a reduced number of operative parts therein and which control means is made of parts of substantially standard or conventional construction.

Another object of the invention is to adjust brake position control means independent of frictional forces applied thereto, and to provide a more reliable and accurate automatic adjustment of the positioning of the brake lining means in the brake than has heretofore been possible.

The foregoing and other objects and advantages of the invention will be made more apparent as the specification proceeds.

Reference now should be had to the accompanying drawings where one currently preferred embodiment of the invention is fully illustrated and described, and wherein;

Fig. 1 is a fragmentary vertical section through a brake having a brake lining positioning control means of the invention provided therein and shown in a released, or clearance position;

When referring to corresponding parts shown in the drawings and referred to in the specification, corresponding numerals are used to facilitate comparison therebetween.

Figure 3:
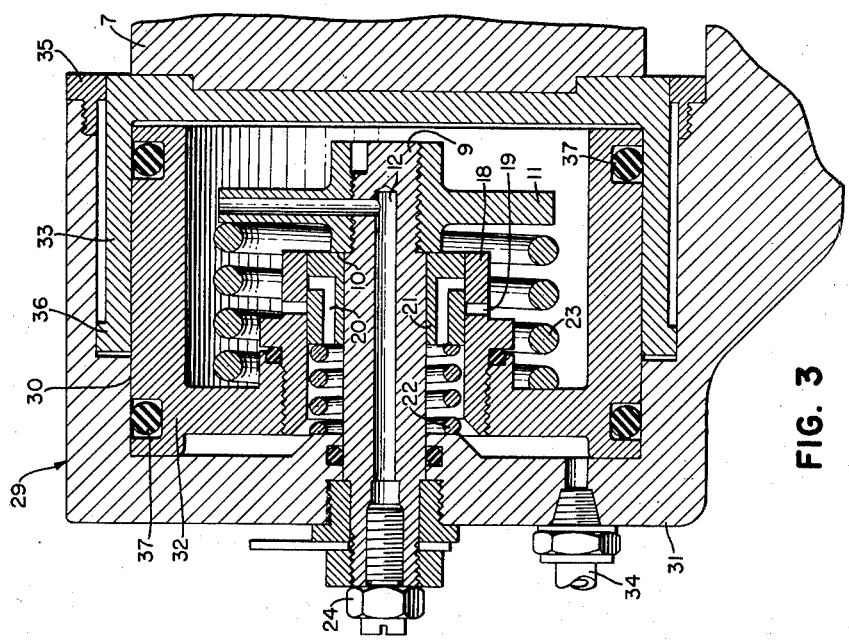
Fig. 3 is a fragmentary vertical section similar to Fig. 1 with a modification of a control means of the invention.

The present invention relates to a brake having a brake housing with a brake cylinder therein, brake lining positioning and actuating apparatus comprising a stop member extending axially into said brake cylinder, a pair of axially overlapped telescoped brake pistons, means for supplying brake actuating fluid to said brake cylinder and thus to one of said pistons, movement of one of said brake pistons being limited by said stop member, valve means on said one brake piston for transmitting brake actuating fluid from said brake cylinder to the other said brake piston after said stop member limits movements of said one brake piston for braking action by said other brake piston, and return means for returning said one brake piston to inoperative position and close said valve means upon release of the brake.

Reference now should be directed to the details of the structure shown in the accompanying drawings, and a brake construction is indicated as a whole by the numeral 1. This brake includes a conventional brake housing 2 which has a brake cylinder 3 provided therein. The brake housing 2 has a wheel 4 in operative association therewith. The wheel 4 engages a brake disc 5 by means of a plurality of axially directed keys 6 provided at spaced portions of the periphery of the brake disc 5 so that the brake disc 5 will be carried by and rotate with the wheel 4 but with the brake disc being movable axially thereof. This brake disc 5 has a pair of spot type brake linings 7 and 8 positioned in a conventional manner adjacent opposed faces of the brake disc 5 for braking action thereon in accordance with conventional braking operations and the special features of the brake 1 as hereinafter described.

The brake cylinder 3 may have a removable end cap provided at the outer end thereof, if desired, but in all events a stationary stop member, or bleeder stem 9 is fixedly secured to the brake housing 2 and extends therefrom into the brake cylinder 3 on the axis thereof. This bleeder stem 9 has a stop sleeve or shoulder 10 secured to or provided on the axially inner end thereof, and a stop disc 11 is also provided on the axially inner end of the bleeder stem 9, as by being made a part of the stop sleeve 10. Fig. 1 of the drawings best shows that a bleeder bore 12 is provided on the axis of the bleeder stem 9 and it may extend out to the periphery of the stop disc 11 or otherwise connect to a chamber formed thereabout, as hereinafter explained in more detail.

A feature of the present invention is that a pair of telescopically engaged brake pistons 13 and 14 are received in the brake cylinder 3 with the brake piston 13 being the radially outer brake piston, but with the brake piston 14 being the axially inner piston which has one of the brake lining members 7 suitably secured thereto and carried thereby for operative braking action. These brake pistons are independently movable and the brake piston 14 is designed to move farther out of the brake piston 13 as wear occurs to compensate therefor automatically. Fig. 1 of the drawings best shows that this brake piston 13 is slidably received in the brake cylinder and suitable hydraulic pressure fluid is supplied to such brake cylinder 3 as by means of a conventional fitting 15 to which a hydraulic pressure fluid supply line 16 connects. The line 16 connects to conventional brake actuating means (not shown). The hydraulic fluid passes to a bore 17 that connects to the axially outer end of the brake cylinder 3. A valve sleeve 18 is secured to the radially inner portion of the brake piston 13 and moves therewith in the brake cylinder. Such valve sleeve 18 has one or more bores or ports 19 provided therein, which bores or ports 19 are adapted to register with corresponding bores 20 provided in a second valve member 21. Preferably this valve member 21 is carried by the bleeder stem 9 and is shown urged against the stop sleeve 10 by means of a coil spring 22 compressed between an end portion of the brake housing 2 and the adjacent end of the valve member 21.

In all events, the valve member 21 normally is stationary and the bore 20 has one end portion thereof continually exposed to the pressure of hydraulic fluid present in the brake cylinder 3. Such pressure fluid will pass through the bore 20 when the bore 19 is brought into registry therewith and the fluid will then pass into a chamber formed intermediate the brake pistons 13 and 14. The movable brake piston 14 is forced axially inwardly of the brake 1 for braking action when the bores 19 and 20 are brought into registry. It will be seen that the valve sleeve 18 should have as fluid tight fit on the valve member 21 as is commercially feasible. Initially upon brake actuation, the brake piston 13 could be brought into engagement with the brake piston 14 to move as a unit therewith until the brake lining discs 7 and 8 are brought into contact with opposite faces of the brake disc 5 for braking action thereon.

Figure 2:
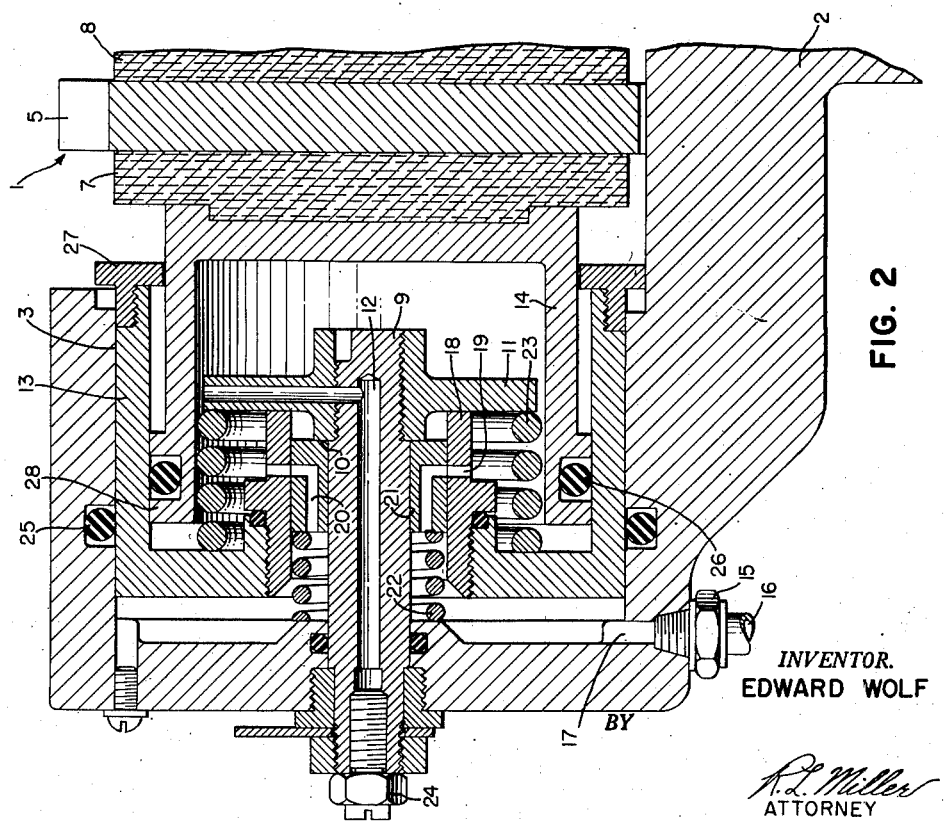
Fig. 2 is a similar section to Fig. 1, only with the brake means operatively positioned and with the brake lining being worn.

When new, thick brake lining discs 7 and 8 are used in the brake 1, the braking action would be secured as previously stated. However, after the brake lining discs become worn, as indicated in Fig. 2, then there is sufficient movement of the brake pistons 13 and 14 from the released positions shown in Fig. 1 as to bring the bores 20 and 19 into registry and permit passage of hydraulic fluid to the interior of the brake piston 14 to force it axially outwardly of the remainder of the braking means. It should be noted that the initial axial spacing of the bores 19 and 20 in the brake 1 can be varied as desired so as to bring the hydraulic braking pressure to the interior of the brake piston 14 at any desired stage of wear of the brake means.

The brake 1 has a return spring 23 provided therein compressed between the outer end of the brake piston 13 and the stop disc 11 so that forces stored in such return spring 23 will back off the brake piston 13 and provide a standard clearance in the braking means when released. The brake piston 14 will be pulled by suction to retracted or clearance position when the brake piston 13 is so moved to inoperative position.

A bleeder nut 24 is shown engaged with the outer end of the bleeder stem 9 to close the bore 12 therein but to permit any amount of hydraulic fluid trapped in the brake piston 14 to be bled therefrom, as desired.

It should be noted that conventional packing means 25 are provided between the brake housing 2 and the brake piston 13 slidably engaged therewith and that a similar conventional gasket 26 is received between the adjacent sliding contacting portions of the brake pistons 13 and 14. A lock ring 27 is provided in engagement with the axially inner end of the brake piston 13 to hold the pistons in operative relation after the piston 14 has been inserted into telescopic engagement with the brake piston 13.

Fig. 1 of the drawings shows that an end flange 28 is provided on the brake piston 14 at the axially outer end thereof for engagement with the lock ring 27 to prevent operative disengagement of the brake piston and provide a safety feature in the apparatus.

Fig. 3 of the drawings shows a modification of the brake of the invention and which structure is indicated as a whole by the numeral 29. Such brake in general has the same components as the brake 1, but in this instance a brake cylinder 30 is provided in a brake housing 31. A radially inner brake piston 32 is provided and is held in sliding engagement with a portion of the brake cylinder 30 and also being slidably engaged with a radially outer brake piston 33. The brake piston 32 is supplied with hydraulic pressure fluid through a conventional fitting and supply line 34. The radially outer brake piston 33 is held in engagement with the brake housing 31 by a suitable lock ring 35 that engages a flange 36 extending radially outwardly from the axially inner end of such brake piston 33 to prevent any disengagement of the brake pistons after once operatively engaged with each other. Otherwise, the remainder of the braking components are of the same construction as described hereinbefore and with the brake 29 functioning in general similar to the brake previously described. It will be noted that the inner brake piston 32 in this instance carries a pair of gasket means 37 for sealing engagement intermediate the two brake pistons and for sealing engagement with the brake cylinder, as best shown in Fig. 3.

In view of the foregoing, it will be seen that a novel hydraulic type of a control has been provided as an automatic adjustment for brakes. In all instances, it is submitted that a standard clearance action will be secured in the brake piston and associated means regardless of the extent of wear of the brake lining members. The return springs provided in the brakes of the invention would in all events act to force the one brake piston to move axially in such a manner as to disengage the hydraulic pressure supply bores or ports from each other and to require limited axial movement of one brake piston to reengage the fluid supply ports to connect to the axially inner of the brake pistons for exerting braking pressure thereon. These hydraulically engaged pistons provide a minimum of operative parts and an uncomplicated, automatic adjustment for lining wear has been provided for the brake. This reliable brake adjustment is of compact size and permits adjustment of the brake independent of the forces exerted thereon. Thus it is thought that the objects of the invention have been achieved.

While a certain representative embodiment and details have been shown for the purpose of illustrating the invention, it will be apparent to those skilled in this art that various changes and modifications may be made therein without departing from the spirit or scope of the invention.

I claim:

1. In a brake, a brake housing having a brake cylinder therein, a brake disc adapted to be attached to a wheel for rotation therewith, brake lining means at least partially positioned by said brake housing on opposite faces of said brake disc, a bleeder stem secured to said brake housing and extending into said brake cylinder, a stop disc secured to said bleeder stem adjacent the inner end thereof, an outer brake piston slidably received in said brake cylinder, said brake housing having a brake fluid supply port therein connecting to said brake cylinder, a return spring compressed between said outer brake piston and said stop disc for returning said outer brake piston to a clearance position, an inner brake piston slidably carried in said outer brake piston and operatively positioning at least part of said brake lining means, and valve means connecting said brake cylinder to said inner brake piston for brake fluid flow thereto only after predetermined braking movement of said outer brake piston.

2. In a brake, a brake housing having a brake cylinder therein, a brake disc adapted to be attached to a wheel for rotation therewith, brake lining means at least partially positioned by said brake housing on opposite faces of said brake disc, a bleeder stem secured to said brake housing and extending into said brake cylinder along the axis thereof, a stop secured to said bleeder stem adjacent the inner end thereof, an outer brake piston slidably received in said brake cylinder, said brake housing having a brake fluid supply port therein connecting to said brake cylinder, a return spring compressed between said outer brake piston and said stop for returning said outer brake piston to a clearance position on brake release, an inner brake piston slidably carried in said outer brake piston and operatively positioning at least part of said brake lining means, gasket means intermediate said inner and outer pistons, and valve means carried by and movable with said outer piston to connect said brake cylinder to said inner brake piston for brake fluid flow thereto only after predetermined braking movement of said outer brake piston.

3. In a brake, a brake housing having a brake cylinder therein, a brake disc adapted to be attached to a wheel for rotation therewith, brake lining means at least partially positioned by said brake housing on opposite faces of said brake disc, a stop member secured to said brake housing and extending into said brake cylinder, an outer brake piston slidably received in said brake cylinder, said brake housing having a brake fluid supply port therein connecting to said brake cylinder, a return spring compressed between said outer brake piston and said stop member for returning said outer brake piston to a clearance position, an inner brake piston slidably carried in said outer brake piston and operatively positioning at least part of said brake lining means, valve means connecting the interior of said outer brake piston to said inner brake piston for brake fluid flow thereto only after predetermined braking movement of said outer brake piston, and gasket means forming a fluid tight compartment between said inner and outer pistons for unitary return movement thereof but to permit independent movement of said inner brake piston as brake lining wear occurs to compensate for such wear by additional movement of said inner brake piston.

4. In a brake having a brake housing with a brake cylinder therein, brake lining positioning and actuating apparatus comprising a stop member extending axially into said brake cylinder, a pair of axially overlapped telescoped inner and outer brake pistons, means for supplying brake actuating fluid to the inner of said pistons, movement of said inner brake piston being limited by said stop member, port and valve means for transmitting brake actuating fluid from said brake cylinder to said outer brake piston after said stop member limits movement of said inner brake piston for braking action by said outer brake piston, and return means for returning said inner brake piston to inoperative position and close said valve means, said outer brake piston being moved as a unit with said inner brake piston by suction action on release of the brake.

5. In a brake having a brake housing with a brake cylinder therein, brake lining positioning and actuating apparatus comprising a stop member extending axially into said brake cylinder, a pair of independently movable axially overlapped telescoped brake pistons, means for supplying brake actuating fluid to said brake cylinder and the first of said pistons, movement of the first of said brake pistons being limited by said stop member, slide-type valve means movable with said first brake piston for transmitting brake actuating fluid from said brake cylinder to the second of said brake pistons after said stop member limits movements of said first brake piston for braking action by said second brake piston, and spring means compressed between said stop member and said first brake piston for returning said first brake piston to inoperative position and to close said valve means on release of pressure on said brake actuating fluid.

6. In a brake having a brake housing with a brake cylinder therein, brake lining positioning and actuating apparatus comprising a stop member extending axially into said brake cylinder, a pair of axially overlapped telescoped brake pistons, means for supplying brake actuating fluid to the first of said pistons, movement of said first of said brake pistons being limited by said stop member, valve means for transmitting brake actuating fluid from said brake cylinder to the second of said brake pistons after said stop member limits movement of said first brake piston for braking action by said second brake piston, and return means for moving said first brake piston to inoperative position and to close said valve means.

7. In a brake having a brake housing with a brake cylinder therein, brake lining positioning and actuating apparatus comprising a pair of axially overlapped telescoped brake pistons the first of which is fitted in sliding engagement with the bore of said cylinder, means for supplying brake actuating fluid to the first of said pistons, means fixed to said cylinder for limiting movement of said first of said pistons, valve means for transmitting brake actuating fluid from said brake cylinder to the second of said brake pistons after said fixed means limits movement of said first brake piston for braking action by said second brake piston, and return means for moving said first brake piston to inoperative position and to close said valve means.

8. In a brake having a brake housing with a brake cylinder therein, brake lining positioning and actuating apparatus comprising a pair of axially overlapped telescoped brake pistons, means for supplying brake actuating fluid to the first of said pistons, fixed means for limiting movement of said first of said pistons, valve means carried by said first of said brake pistons for transmitting brake actuating fluid from said brake cylinder to the second of said brake pistons after said fixed means limits movement of said first brake piston for braking action by said second brake piston, and spring means compressed between said first brake piston and said fixed movement limiting means for moving said first brake piston to released position and to close said valve means, said second brake piston being moved to released position with movement of said first brake piston by suction action.

References Cited in the file of this patent
UNITED STATES PATENTS

| | | |
|---|---|---|
| 2,227,245 | Carroll | Dec. 31, 1940 |
| 2,234,689 | Chard | Mar. 11, 1941 |
| 2,474,749 | Miller | June 28, 1949 |